US012116536B1

(12) United States Patent
Alnaimi et al.

(10) Patent No.: US 12,116,536 B1
(45) Date of Patent: Oct. 15, 2024

(54) PROCESS AND APPARATUS FOR CONVERTING CRUDE OIL TO CHEMICALS

(71) Applicant: Saudi Arabian Oil Company, Dhahran (SA)

(72) Inventors: Essa I. Alnaimi, Dhahran (SA); Lianhui Ding, Dhahran (SA); Alberto Lozano, Dhahran (SA); Sameer Al-Ghamdi, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 18/314,310

(22) Filed: May 9, 2023

(51) Int. Cl.
*C10G 65/12* (2006.01)
*B01D 3/14* (2006.01)

(52) U.S. Cl.
CPC .............. *C10G 65/12* (2013.01); *B01D 3/14* (2013.01); *C10G 2300/308* (2013.01); *C10G 2400/20* (2013.01); *C10G 2400/22* (2013.01); *C10G 2400/30* (2013.01)

(58) Field of Classification Search
CPC .............. C10G 65/12; C10G 2300/308; C10G 2400/20; C10G 2400/22; C10G 2400/30; B01D 3/14
See application file for complete search history.

(56) References Cited

U.S. PATENT DOCUMENTS

| 9,550,707 | B2 | 1/2017 | Schrod et al. | |
|---|---|---|---|---|
| 2008/0223754 | A1* | 9/2008 | Subramanian | C10G 69/04 |
| | | | | 196/14.52 |
| 2016/0369189 | A1* | 12/2016 | Ward | C10G 69/00 |

FOREIGN PATENT DOCUMENTS

| CN | 113817503 A | 12/2021 |
|---|---|---|
| EP | 3530718 B1 | 7/2021 |

OTHER PUBLICATIONS

Querini, "Isobutane/butene alkylation: regeneration of solid acid catalysts", Catalysis Today, vol. 62, pp. 135-143, 2000.

* cited by examiner

*Primary Examiner* — Ellen M McAvoy
*Assistant Examiner* — Chantel Graham
(74) *Attorney, Agent, or Firm* — Dinsmore & Shohl LLP

(57) ABSTRACT

A method of processing a hydrocarbon feed may comprise fractionating the hydrocarbon feed into a light stream, a medium-light stream, a medium-heavy stream, and a heavy stream; passing the medium-heavy stream to a hydrocracker to produce a hydrocracked medium-heavy stream; passing the heavy stream to a delayed coker to produce a cracked heavy stream; and passing the medium-light stream, the hydrocracked medium-heavy stream, and the cracked heavy stream to a catalytic reformer to produce an aromatics stream.

20 Claims, 1 Drawing Sheet

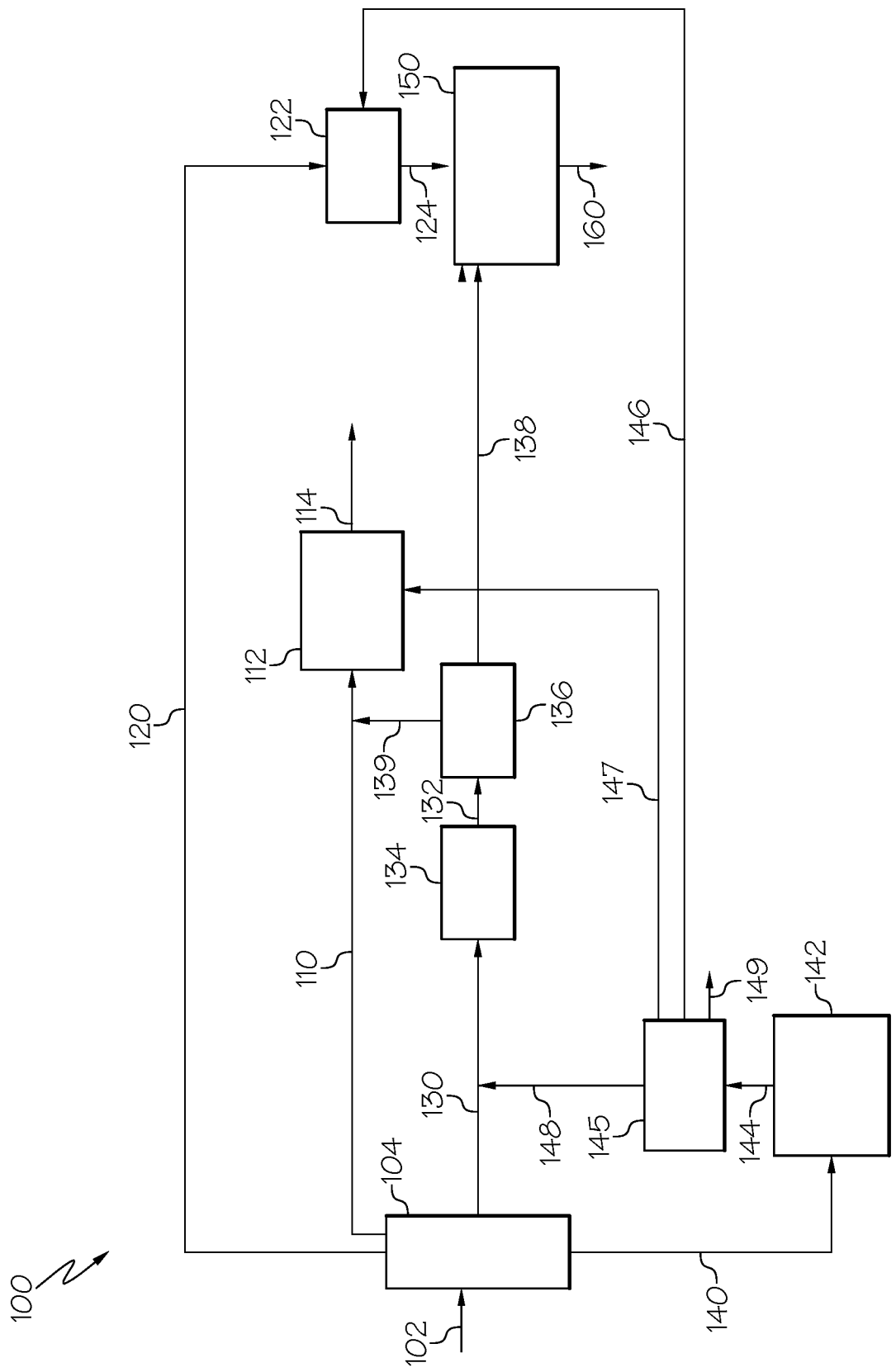

PROCESS AND APPARATUS FOR CONVERTING CRUDE OIL TO CHEMICALS

BACKGROUND

Field

The present disclosure relates to processes and apparatuses for processing petroleum-based materials and, in particular, processes and systems for converting crude oil.

Technical Background

The worldwide increasing demand for light olefins and aromatics remains a major challenge for many integrated refineries. In particular, the production of valuable aromatics and olefins, such as benzene, toluene, and xylene ("BTX"), has attracted increased attention as aromatics and olefins and are considered versatile intermediate chemicals. Catalytic reforming is considered to be one of the most efficient routes to transform hydrocarbon feedstocks into aromatics. One preferred feedstock for the catalytic reformer is heavy naphtha. However, traditional refinery processes produce limited quantities of heavy naphtha and other suitable catalytic reforming feed stocks.

SUMMARY

Accordingly, there is an ongoing need for integrated processes which can convert wide boiling range hydrocarbons, such as crude oil, into aromatics and light olefins. The processes of the present disclosure meet this need by fractionating the wide boiling range hydrocarbons into four streams and, as appropriate, steam cracking, hydrotreating, hydrocracking, and delayed coking the fractions. The processes then include catalytic reforming of the each of the processed streams. The particular configuration of steps may allow the catalytic reformer to produce the greatest quantity of aromatic and olefin compounds possible.

According to a first embodiment of the present disclosure, a method of processing a hydrocarbon feed comprises fractionating the hydrocarbon feed into a light stream, a medium-light stream, a medium-heavy stream, and a heavy stream; passing the medium-heavy stream to a hydrocracker to produce a hydrocracked medium-heavy stream; passing the heavy stream to a delayed coker to produce a cracked heavy stream; and passing the medium-light stream, the hydrocracked medium-heavy stream, and the cracked heavy stream to a catalytic reformer to produce an aromatics stream. The light stream comprises at least 50 wt. % of $C_1$ to $C_6$ hydrocarbons, based on the total weight of hydrocarbons in the light stream. The medium-light stream comprises at least 50 wt. % of $C_6$ to $C_{12}$ hydrocarbons, based on the total weight of hydrocarbons in the medium-light stream. The medium-heavy stream comprises at least 50 wt. % of $C_{12}$ to $C_{40}$ hydrocarbons, based on the total weight of hydrocarbons in the medium-heavy stream. The heavy stream comprises at least 50 wt. % of $C_{40}$ or larger hydrocarbons, based on the total weight of hydrocarbons in the heavy stream.

According to an embodiment of the present disclosure, a method of processing a hydrocarbon feed comprises fractionating the hydrocarbon feed into a light stream, a medium-light stream, a medium-heavy stream, and a heavy stream; passing the light stream to a steam cracking unit to produce a cracked light stream; passing the medium-heavy stream to a hydrocracker to produce a hydrocracked medium-heavy stream; passing the heavy stream to a delayed coker to produce a cracked heavy stream; and passing the medium-light stream, the hydrocracked medium-heavy stream, and the cracked heavy stream to a catalytic reformer to produce an aromatics stream. The light stream comprises at least 80 wt. % of $C_1$ to $C_6$ hydrocarbons, based on the total weight of hydrocarbons in the light stream. The medium-light stream comprises at least 80 wt. % of $C_6$ to $C_{12}$ hydrocarbons, based on the total weight of hydrocarbons in the medium-light stream. The medium-heavy stream comprises at least 80 wt. % of $C_{12}$ to $C_{40}$ hydrocarbons, based on the total weight of hydrocarbons in the medium-heavy stream. The heavy stream comprises at least 80 wt. % of $C_{40}$ or larger hydrocarbons, based on the total weight of hydrocarbons in the heavy stream. Passing the medium-light stream to the catalytic reformer further comprises passing the medium-light stream to a hydrotreater to produce a hydrotreated medium-light stream and passing the hydrotreated medium-light stream to the catalytic reformer. Passing the hydrocracked medium-heavy stream to the catalytic reformer comprises passing the hydrocracked medium-heavy stream to a separator to produce a second medium-heavy stream; and passing the second medium-heavy stream to the catalytic reformer. Passing the hydrocracked medium-heavy stream to the separator further produces a second $C_2$-$C_6$ stream, the method further comprising passing the second $C_2$-$C_6$ stream to the steam cracking unit to produce the cracked light stream. Passing the cracked heavy stream to the catalytic reformer comprises passing the cracked heavy stream to a coke fractionator to produce one or more of: a third $C_2$-$C_6$ stream, a liquid >180° C. stream, and a second 65° C. to 180° C. stream; and passing the second 65° C. to 180° C. stream to the catalytic reformer. The second 65° C. to 180° C. stream comprises at least 80 wt. % of $C_6$-$C_{12}$ hydrocarbons, based on the total weight of hydrocarbons in the second 65° C. to 180° C. stream. Passing the second 65° C. to 180° C. stream to the catalytic reformer comprises passing the second 65° C. to 180° C. stream to the hydrotreater.

Additional features and advantages of the aspects of the present disclosure will be set forth in the detailed description that follows and, in part, will be readily apparent to a person of ordinary skill in the art from the detailed description or recognized by practicing the aspects of the present disclosure.

BRIEF DESCRIPTION OF THE DRAWING

The following detailed description of the present disclosure may be better understood when read in conjunction with the following drawing in which:

FIG. 1 schematically depicts a generalized flow diagram of a system for converting a hydrocarbon, according to one or more embodiments of the present disclosure.

When describing the simplified schematic illustration of FIG. 1, the numerous valves, temperature sensors, electronic controllers, and the like, which may be used and are well known to a person of ordinary skill in the art, are not included. Further, accompanying components that are often included in systems such as those depicted in FIG. 1, such as air supplies, heat exchangers, surge tanks, and the like are also not included. However, a person of ordinary skill in the art understands that these components are within the scope of the present disclosure.

Additionally, the arrows in the simplified schematic illustration of FIG. 1 refer to process streams. However, the arrows may equivalently refer to transfer lines, which may transfer process steams between two or more system components. Arrows that connect to one or more system components signify inlets or outlets in the given system components and arrows that connect to only one system component signify a system outlet stream that exits the depicted system or a system inlet stream that enters the depicted system. The arrow direction generally corresponds with the major direction of movement of the process stream or the process stream contained within the physical transfer line signified by the arrow.

The arrows in the simplified schematic illustration of FIG. 1 may also refer to process steps of transporting a process stream from one system component to another system component. For example, an arrow from a first system component pointing to a second system component may signify "passing" a process stream from the first system component to the second system component, which may comprise the process stream "exiting" or being "removed" from the first system component and "introducing" the process stream to the second system component.

Reference will now be made in greater detail to various aspects, some of which are illustrated in the accompanying drawings.

DETAILED DESCRIPTION

The present disclosure is directed to processes and configurations for upgrading hydrocarbon streams, such as crude oil, to produce greater value chemical products and intermediates, such as but not limited to light olefins, aromatic compounds, and combinations thereof. The processes of the present disclosure may include fractionating the crude oil into four streams. The processes may further include hydrotreating the medium-light stream, hydrotreating and hydrocracking the medium-heavy stream, and delayed coking the heavy stream.

Definitions

As used herein:
"API" refers to the American Petroleum Institute.
"° C." means degrees Celsius.
"wt. %" means weight percent.
"mol. %" means mole percent.
"$h^{-1}$" means 1/hours.
"$C_x$" means a carbon chain having x carbons.
"psig" means pounds per square inch gauge pressure.
"MBPD" means thousand barrels per day.
"crude oil" refers to a mixture of petroleum liquids and gases, including impurities, such as sulfur-containing compounds, nitrogen-containing compounds, and metal compounds, extracted directly from a subterranean formation or received from a desalting unit without having any fractions, such as naphtha, separated by distillation.

As used in the present disclosure, passing a stream or effluent from one unit "directly" to another unit refers to passing the stream or effluent from the first unit to the second unit without passing the stream or effluent through an intervening reaction system or separation system that substantially changes the composition of the stream or effluent. Heat transfer devices, such as heat exchangers, preheaters, coolers, condensers, or other heat transfer equipment, and pressure devices, such as pumps, pressure regulators, compressors, or other pressure devices, are not considered to be intervening systems that change the composition of a stream or effluent. Combining two streams or effluents together also is not considered to comprise an intervening system that changes the composition of one or both of the streams or effluents being combined.

It should be understood therefore, that when a stream is not specifically passed "directly," it may undergo steps which cause a change in its composition. For example, when a stream is merely "passed" from a first unit to a second unit, it may undergo separation steps, reaction steps, or both. In such embodiments, all of the stream, or only a portion of the stream may pass from the first unit to the second unit. For example, when the medium-heavy stream is passed from the hydrocracker to the catalytic reformer, the medium-heavy stream may be separated into a second medium-heavy stream and a second $C_2$-$C_6$ stream 139, and only the second medium-heavy stream may reach the catalytic reformer. Alternatively, when the medium-heavy stream is passed from the hydrocracker to the catalytic reformer, the medium-heavy stream may pass directly from the hydrocracker to the catalytic reformer.

"cut point" refers to the temperature that defines the boundary between two crude oil fractions.

"lower cut point" refers to the temperature above which all components of the fraction boil. In a stream defined by a lower cut point, at least 80 wt. %, at least 90 wt. %, at least 95 wt. %, at least 99 wt. %, or even at least 99.9 wt. % of the components in the stream may boil above the lower cut point.

"upper cut point" refers to the temperature below which all components of the fraction boil. In a stream defined by an upper cut point, at least 80 wt. %, at least 90 wt. %, at least 95 wt. %, at least 99 wt. %, or even at least 99.9 wt. % of the components in the stream may boil below the upper cut point.

Embodiments

Referring now to FIG. 1, a method 100 of processing a hydrocarbon feed 102 may comprise fractionating the hydrocarbon feed 102 into a light stream 110, a medium-light stream 120, a medium-heavy stream 130, and a heavy stream 140. The medium-heavy stream 130 may be passed to a hydrocracker 134 to produce a hydrocracked medium-heavy stream 132. The heavy stream 140 may be passed to a delayed coker 142 to produce a cracked heavy stream 144. The medium-light stream 120, the hydrocracked medium-heavy stream 132, and the cracked heavy stream 144 may be passed to a catalytic reformer 150 to produce an aromatics stream 160.

The hydrocarbon feed 102 may be a crude oil. The crude oil may be a raw hydrocarbon which has not been previously processed, such as through one or more of distillation, cracking, hydroprocessing, desalting, or dehydration. The crude oil may have undergone at least some processing, such as desalting, solids separation, scrubbing, or combinations of these, but has not been subjected to distillation. For instance, the crude oil may be a de-salted crude oil that has been subjected to a de-salting process. The crude oil may not have undergone pretreatment, separation (such as distillation), or other operation that changes the hydrocarbon composition of the crude oil prior to introducing the crude oil to the process. As used herein, the "hydrocarbon composition" of the crude oil refers to the composition of the hydrocarbon constituents of the crude oil and does not include entrained non-hydrocarbon solids, salts, water, or other non-hydrocarbon constituents.

The crude oil may have an American Petroleum Institute ("API") gravity of at least 25. For example, the API of the crude oil may be at least 25, at least 27, at least 29, at least 30, at least 31, from 25 to 40, from 28 to 39, from 30 to 39, from 25 to 50, from 39 to 50, or any subset thereof. In some embodiments, the crude oil may be an Arab light crude oil, an Arab extra light crude oil, or an Arab super light crude oil. For example, the crude oil may be an Arab light crude oil.

The hydrocarbon feed 102 may be a gas condensate. The gas condensate may have an API gravity of at least 25, at least 27, at least 29, at least 30, at least 31, from 25 to 40, from 28 to 39, from 30 to 39, from 25 to 50, from 39 to 50, or any subset thereof. The API gravity may be from a natural well, a shale well, or both.

The hydrocarbon feed 102 may be a mixture of a crude oil and a gas condensate. The mixture of crude oil and gas condensate may have an API gravity of at least 25, at least 27, at least 29, at least 30, at least 31, from 25 to 40, from 28 to 39, from 30 to 39, from 25 to 50, from 39 to 50, or any subset thereof.

The hydrocarbon feed 102 may have a density of greater than 0.8 grams per milliliter (g/ml), greater than 0.82 g/ml, greater than 0.84 g/ml, 0.86 g/ml, 0.88 g/ml, greater than 0.90 g/ml, greater than 0.91 g/ml, from 0.8 g/ml to 1.0 g/ml, from 0.84 to 0.96 g/ml, from 0.86 g/ml to 0.93 g/ml, from 0.88 g/ml to 0.92 g/ml, from 0.9 g/ml to 0.92 g/ml, or any subset thereof, at a temperature of 15 degrees Celsius.

The hydrocarbon feed 102 may have an initial boiling point from 30° C. to 50° C. For example, the hydrocarbon feed 102 may have an initial boiling point from 30° C. to 45° C., from 30° C. to 40° C., from 30° C. to 35° C., from 35° C. to 50° C., from 40° C. to 50° C., from 45° C. to 50° C., or any subset thereof. The initial boiling point may be determined according to standard test method ASTM D7169.

The hydrocarbon feed 102 may have an end boiling point (also referred to herein as "EBP" and "FBP") greater than 720 degrees Celsius. For example, the hydrocarbon feed 102 may have an end boiling point greater than 740° C., greater than 760° C., greater than 780° C., greater than 800° C., greater than 850° C., greater than 900° C., greater than 950° C., or greater than 1000° C. The hydrocarbon feed 102 may have an end boiling point less than 2000° C., less than 1800° C., less than 1600° C., less than 1400° C., less than 120° C., less than 1000° C., less than 900° C., less than 800° C., less than 750° C., or any subset thereof. The end boiling point may be determined according to standard test method ASTM D7169.

At least 50 weight percent of the hydrocarbon feed 102 may have a boiling point temperature greater than or equal to 300° C. For example, the hydrocarbon feed 102 may have a 50 wt. % boiling point temperature from 300° C. to 500° C., from 300° C. to 475° C., from 300° C. to 450° C., from 300° C. to 425° C., from 300° C. to 400° C., from 300° C. to 375° C., 350° C. to 500° C., from 350° C. to 475° C., from 350° C. to 450° C., from 350° C. to 425° C., from 350° C. to 400° C., from 350° C. to 375° C., 375° C. to 500° C., from 375° C. to 475° C., from 375° C. to 450° C., from 375° C. to 425° C., from 375° C. to 400° C., or any subset thereof. The 50 weight percent boiling temperature may be determined according to standard test method ASTM D7169.

The hydrocarbon feed 102 may have a concentration of nitrogen of less than or equal to 5000 parts per million by weight (ppmw). For example, the hydrocarbon feed 102 may have a nitrogen concentration of less than 4500 ppmw, less than 4000 ppmw, less than 3500 ppmw, less than 3000 ppmw, less than 2500 ppmw, less than 2000 ppmw, from 1000 ppmw to 5000 ppmw, from 1000 to 4000 ppmw, from 1000 ppmw to 3000 ppmw, from 1000 ppmw to 2000 ppmw, or any subset thereof. The nitrogen concentration of the hydrocarbon feed 102 may be determined according to standard test method ASTM D4629.

The hydrocarbon feed 102 may have a concentration of paraffin compounds of less than 50 wt. % per unit weight of the hydrocarbon feed 102. For example, the hydrocarbon feed 102 may have a concentration of paraffin compounds of less than or equal to 40 wt. %, less than or equal to 35 wt. %, less than or equal to 30 wt. %, less than or equal to 25 wt. %, less than or equal to 20 wt. %, less than or equal to 15 wt. %, less than or equal to 10 wt. %, or even less than or equal to 5 wt. %, per unit weight of the hydrocarbon feed 102. In embodiments, the hydrocarbon feed 102 may have a concentration of paraffin compounds of from 5 wt. % to less than 50 wt. %, from 5 wt. % to 40 wt. %, from 5 wt. % to 35 wt. %, from 5 wt. % to 30 wt. %, from 5 wt. % to 25 wt. %, from 5 wt. % to 20 wt. %, from 10 wt. % to less than 50 wt. %, from 10 wt. % to 40 wt. %, from 10 wt. % to 35 wt. %, from 10 wt. % to 30 wt. %, from 10 wt. % to 25 wt. %, or even from 10 wt. % to 20 wt. % per unit weight of the hydrocarbon feed 102. The paraffin content of the hydrocarbon feed 102 may be determined according to ASTM 5443.

The hydrocarbon feed 102 may have a concentration of aromatic compounds of greater than or equal to 20 wt. % per unit weight of the hydrocarbon feed 102. For example, the hydrocarbon feed 102 may have a concentration of aromatic compounds of greater than or equal to 30 wt. %, greater than or equal to 40 wt. %, or even greater than or equal to 50 wt. % per unit weight of the hydrocarbon feed 102, as determined according to ASTM 5443. In embodiments, the hydrocarbon feed 102 may have a concentration of aromatic compounds of from 20 wt. % to 90 wt. %, from 20 wt. % to 80 wt. %, from 20 wt. % to 70 wt. %, from 30 wt. % to 90 wt. %, from 30 wt. % to 80 wt. %, from 30 wt. % to 70 wt. %, from 40 wt. % to 90 wt. %, from 40 wt. % to 80 wt. %, from 40 wt. % to 70 wt. %, from 50 wt. % to 90 wt. %, from 50 wt. % to 80 wt. %, from 50 wt. % to 70 wt. %, or any subset thereof, per unit weight of the hydrocarbon feed 102.

The hydrocarbon feed 102 may have a concentration of naphthenes of greater than or equal to 25 wt. % per unit weight of the hydrocarbon feed 102. For example, the hydrocarbon feed 102 may have a concentration of naphthenes greater than or equal to 27 wt. % per unit weight of the hydrocarbon feed 102, as determined according to ASTM 5443. In embodiments, the hydrocarbon feed 102 can have a concentration of naphthenes of from 25 wt. % to 60 wt. %, from 25 wt. % to 50 wt. %, from 25 wt. % to 40 wt. %, from 25 wt. % to 35 wt. %, from 27 wt. % to 60 wt. %, from 27 wt. % to 50 wt. %, from 27 wt. % to 40 wt. %, from 27 wt. % to 35 wt. %, or any subset thereof per unit weight of the hydrocarbon feed 102.

The hydrocarbon feed 102 may be fractionated in a fractionator 104 into four streams. Specifically, the hydrocarbon feed 102 may be fractionated into a light stream 110, a medium-light stream 120, a medium-heavy stream 130, and a heavy stream 140. In some embodiments, the hydrocarbon feed 102 may be fractionated into exactly four streams.

In some embodiments, most or all of the hydrocarbon feed 102 may be contained within the light stream 110, the medium-light stream 120, the medium-heavy stream 130, and the heavy stream 140. For example, at least 70 wt. %, at least 80 wt. %, at least 90 wt. %, or at least 99 wt. % of the hydrocarbons in the hydrocarbon feed 102 may be contained within the light stream 110, the medium-light stream 120, the medium-heavy stream 130, and the heavy stream 140.

The hydrocarbon feed 102 may be fractionated using any conventional fractionation or separation technique. A separation technique selectively separates different chemical constituents from one another, forming one or more chemical fractions without modifying altering the chemical constituents. For example, the fractionation technique may include one or more of distillation columns, fractionators, flash drums, knock-out drums, knock-out pots, centrifuges, filtration devices, traps, scrubbers, expansion devices, membranes, solvent extraction devices, high-pressure separators, low-pressure separators. According to some embodiments, the hydrocarbon feed 102 may be fractionated using a distillation column.

The light stream 110 may have an upper cut point of from 60° C. to 70° C. For example, the light stream 110 may have an upper cut point of 62° C., 64° C., 65° C., 66° C., 68° C., from 62° C. to 68° C., or from 64° C. to 66° C.

The light stream 110 may comprise at least 50 wt. % of hydrocarbons boiling at less than or equal to 65° C., based on the total weight of hydrocarbons in the light stream 110. For example, the light stream 110 may comprise at least 55 wt. %, at least 60 wt. %, at least 65 wt. %, at least 70 wt. %, at least 75 wt. %, at least 80 wt. %, at least 85 wt. %, at least 90 wt. %, at least 95 wt. %, at least 99 wt. %, or even at least 99 wt. % of hydrocarbons boiling at less than or equal to 65° C., based on the total weight of hydrocarbons in the light stream 110.

The light stream 110 may comprise at least 50 wt. % of $C_1$ to $C_6$ hydrocarbons, based on the total weight of hydrocarbons in the light stream 110. For example, the light stream 110 may comprise at least 55 wt. %, at least 60 wt. %, at least 65 wt. %, at least 70 wt. %, at least 75 wt. %, at least 80 wt. %, at least 85 wt. %, at least 90 wt. %, at least 95 wt. %, at least 99 wt. %, or even at least 99 wt. % of $C_1$ to $C_6$ hydrocarbons, based on the total weight of hydrocarbons in the light stream 110.

The light stream 110 may comprise at least 50 wt. % of all hydrocarbons boiling at a temperature below 65° C., which were originally in the hydrocarbon feed 102. For example, the light stream 110 may comprise at least 60 wt. %, at least 70 wt. %, at least 80 wt. %, at least 90 wt. %, at least 95 wt. %, at least 99 wt. %, or even at least 99.9 wt. % of all hydrocarbons boiling at a temperature below 65° C., which were originally in the hydrocarbon feed 102.

The medium-light stream 120 may have a lower cut point of from 60° C. to 70° C. and an upper cut point of from 175° C. to 185° C. For example, the medium-light stream 120 may have a lower cut point of 62° C., 64° C., 65° C., 66° C., 68° C., from 62° C. to 68° C., or from 64° C. to 66° C. and an upper cut point of from 175° C. to 185° C., from 177° C. to 183° C., or from 179° C. to 181° C.

The medium-light stream 120 may comprise at least 50 wt. % of hydrocarbons boiling at from 65° C. to 180° C., based on the total weight of hydrocarbons in the medium-light stream 120. In embodiments, the medium-light stream 120 may comprise at least 60 wt. %, at least 70 wt. % at least 80 wt. %, at least 90 wt. %, at least 95 wt. %, at least 99 wt. %, or even at least 99.9 wt. % of hydrocarbons boiling at from 65° C. to 180° C., based on the total weight of hydrocarbons in the medium-light stream 120.

The medium-light stream 120 may comprise at least 50 wt. % of $C_6$ to $C_{12}$ hydrocarbons, based on the total weight of hydrocarbons in the medium-light stream 120. For example, the medium-light stream 120 may comprise at least 55 wt. %, at least 60 wt. %, at least 65 wt. %, at least 70 wt. %, at least 75 wt. %, at least 80 wt. %, at least 85 wt. %, at least 90 wt. %, at least 95 wt. %, at least 99 wt. %, or even at least 99 wt. % of $C_6$ to $C_{12}$ hydrocarbons, based on the total weight of hydrocarbons in the medium-light stream 120.

The medium-light stream 120 may comprise at least 50 wt. % of hydrocarbons boiling at from 65° C. to 180° C. which were initially in the hydrocarbon feed 102. In embodiments, at the medium-light stream 120 may comprise at least 60 wt. %, at least 70 wt. %, at least 80 wt. %, at least 90 wt. %, at least 95 wt. %, at least 99 wt. %, or even at least 99.9 wt. % of hydrocarbons boiling at from 65° C. to 180° C. which were initially in the hydrocarbon feed 102.

The medium-heavy stream 130 may have a lower cut point of from 175° C. to 185° C. and an upper cut point of from 530° C. to 550° C. For example, the medium-heavy stream 130 may have a lower cut point of from 175° C. to 185° C., from 177° C. to 183° C., or from 179° C. to 181° C. The medium-heavy stream 130 may have an upper cut point of from 530° C. to 550° C., from 533° C. to 547° C., from 535° C. to 545° C., from 537° C. to 543° C., or from 539° C. to 541° C.

The medium-heavy stream 130 may comprise at least 50 wt. % of $C_{12}$ to $C_{40}$ hydrocarbons, based on the total weight of hydrocarbons in the medium-heavy stream 130. For example, the medium-heavy stream 130 may comprise at least 55 wt. %, at least 60 wt. %, at least 65 wt. %, at least 70 wt. %, at least 75 wt. %, at least 80 wt. %, at least 85 wt. %, at least 90 wt. %, at least 95 wt. %, at least 99 wt. %, or even at least 99 wt. % of $C_{12}$ to $C_{40}$ hydrocarbons, based on the total weight of hydrocarbons in the medium-heavy stream 130.

The medium-heavy stream 130 may comprise at least 50 wt. % of hydrocarbons boiling from 180° C. to 540° C., based on the total weight of hydrocarbons in the medium-heavy stream 130. In embodiments, the medium-heavy stream 130 may comprise at least 60 wt. %, at least 70 wt. % at least 80 wt. %, at least 90 wt. %, at least 95 wt. %, at least 99 wt. %, or even at least 99.9 wt. % of hydrocarbons boiling at from 180° C. to 540° C., based on the total weight of hydrocarbons in the medium-heavy stream 130.

The medium-heavy stream 130 may comprise at least 50 wt. % of hydrocarbons boiling at from 180° C. to 540° C. which were initially in the hydrocarbon feed 102. In embodiments, at the medium-heavy stream 130 may comprise at least 60 wt. %, at least 70 wt. %, at least 80 wt. %, at least 90 wt. %, at least 95 wt. %, at least 99 wt. %, or even at least 99.9 wt. % of hydrocarbons boiling at from 180° C. to 540° C. which were initially in the hydrocarbon feed 102.

The heavy stream 140 may have a lower cut point of at least 530° C. For example, the heavy stream 140 may have a lower cut point of 533° C., of 535° C., of 537° C., of 539° C., of 540° C., of 545° C., of 550° C., from 530° C. to 550° C., from 533° C. to 547° C., from 535° C. to 545° C., from 537° C. to 543° C., or from 539° C. to 541° C.

The heavy stream 140 may comprise at least 50 wt. % of $C_{40}$ or larger hydrocarbons, based on the total weight of hydrocarbons in the heavy stream 140. For example, the heavy stream 140 may comprise at least 55 wt. %, at least 60 wt. %, at least 65 wt. %, at least 70 wt. %, at least 75 wt. %, at least 80 wt. %, at least 85 wt. %, at least 90 wt. %, at least 95 wt. %, at least 99 wt. %, or even at least 99 wt. % of $C_{40}$ or larger hydrocarbons, based on the total weight of hydrocarbons in the heavy stream 140.

The heavy stream 140 may comprise at least 50 wt. % of hydrocarbons boiling at a temperature of at least 540° C., based on the total weight of hydrocarbons in the heavy stream 140. In embodiments, the heavy stream 140 may comprise at least 60 wt. %, at least 70 wt. % at least 80 wt. %, at least 90 wt. %, at least 95 wt. %, at least 99 wt. %, or even at least 99.9 wt. % of hydrocarbons boiling a temperature of at least 540° C., based on the total weight of hydrocarbons in the heavy stream 140.

The heavy stream 140 may comprise at least 50 wt. % of hydrocarbons boiling at a temperature of at least 540° C. which were initially in the hydrocarbon feed 102. In embodiments, the heavy stream 140 may comprise at least 60 wt. %, at least 70 wt. %, at least 80 wt. %, at least 90 wt. %, at least 95 wt. %, at least 99 wt. %, or even at least 99.9 wt. % of hydrocarbons boiling at a temperature of at least 540° C. which were initially in the hydrocarbon feed 102.

The method 100 of the present disclosure may comprise passing the light stream 110 to a steam cracking unit 112 to produce a cracked light stream 114.

In the steam cracking unit 112, hydrocarbons, such as those in the light stream 110, may be combined with steam at the steam cracking temperature to produce the cracked light stream 114. The steam cracking temperature may be from 500° C. to 1000° C., from 550° C. to 900° C., from 600° C. to 850° C., from 650° C. to 800° C., from 700° C. to 750° C., from 600° C. to 900° C., from 700° C. to 900° C., from 800° C. to 900° C., from 600° C. to 800° C., from 600° C. to 700° C., or any subset thereof.

In the steam cracking unit 112, hydrocarbons, such as those in the light stream 110, may be combined with steam at steam cracking pressure to produce the cracked light stream 114. The hydrocarbons may be combined with steam. For example, the hydrocarbons and steam together may comprise at least 80 wt. %, at least 85 wt. %, at least 90 wt. %, at least 95 wt. %, at least 99 wt. %, at least 99.9 wt. %, or even at least 99.99 wt. % of the atmosphere within the steam cracking unit 112. The steam cracking pressure may be from 0.1 bar to 2 bar, from 0.5 bar to 1.5 bar, from 0.8 bar to 1.2 bar, or from 0.9 bar to 1 bar.

In the steam cracking unit 112, hydrocarbons, such as those in the light stream 110, may be combined with steam at steam/hydrocarbon weight ratio to produce the cracked light stream 114. The steam/hydrocarbon weight ratio may be from 0.1 to 2. For example, the steam/hydrocarbon ratio may be from 0.2 to 1.5, from 0.5 to 1.5, from 0.8 to 1.5, from 1.1 to 1.5, from 1.3 to 1.5, from 0.2 to 1.3, from 0.2 to 1.1, from 0.2 to 0.8, from 0.2 to 0.5, from 0.5 to 1.2, from 0.8 to 0.9, or any subset thereof.

In the steam cracking unit 112, hydrocarbons, such as those in the light stream 110, may be combined with steam at steam cracking residence time to produce the cracked light stream 114. The steam cracking residence time may be from 0.2 to 0.5 seconds, from 0.3 to 0.4 seconds, from 0.2 to 0.4 seconds, from 0.2 to 0.3 seconds, from 0.3 to 0.5 seconds, or from 0.4 to 0.5 seconds. The hydrocarbons may be quenched upon exiting the steam cracking time, to limit cracking to the residence time.

The cracked light stream 114 may comprise from 15 wt. % to 20 wt. % of propylene, based on the total weight of the cracked light stream 114. The cracked light stream 114 may comprise from 8 wt. % to 12 wt. % of propane, based on the total weight of the cracked light stream 114. The cracked light stream 114 may comprise from 4 wt. % to 8 wt. % of butene, based on the total weight of the cracked light stream 114. The cracked light stream 114 may comprise from 5 wt. % to 9 wt. % of butane, based on the total weight of the cracked light stream 114. The cracked light stream 114 may comprise from 6 wt. % to 10 wt. % of $C_5$ to $C_6$ paraffins, based on the total weight of the cracked light stream 114. The cracked light stream 114 may comprise from 2 wt. % to 6 wt. % of $C_5$ to $C_6$ olefins, based on the total weight of the cracked light stream 114. The cracked light stream 114 may comprise from 3 wt. % to 5 wt. % of aromatic compounds, based on the total weight of the cracked light stream 114.

The method 100 of the present disclosure may comprise passing the medium-light stream 120 to the catalytic reformer. In some embodiments, the medium-light stream 120 may be passed directly to the catalytic reformer 150.

Passing the medium-light stream 120 to the catalytic reformer 150 may further comprise passing the medium-light stream 120 to a hydrotreater 122 to produce a hydrotreated medium-light stream 124. The medium-light stream 120 may be passed directly from the fractionator 104 to the hydrotreater 122.

Passing the medium-light stream 120 to the catalytic reformer 150 may further comprise passing the hydrotreated medium-light stream 124 to the catalytic reformer 150. The hydrotreated medium-light stream 124 may be passed directly from the hydrotreater 122 to the catalytic reformer 150. The medium-light stream 120 may be combined with one or more additional streams, such as the hydrocracked medium-heavy stream 132, and the cracked heavy stream 144 before being passed to the catalytic reformer.

The hydrotreater 122 may contact hydrocarbons, such as those of the medium-light stream 120, with a hydrotreating catalyst, at a hydrotreating temperature, pressure, atmosphere, and liquid hourly space velocity (LHSV).

The hydrotreating catalyst may comprise one or more of a hydrodemetallization catalyst, a hydrodesulfurization catalyst, a hydrodearomatization catalyst, hydrodenitrogenation catalysts, hydrodeoxygenation catalysts, or all of these. In some embodiments, the hydrotreating catalyst may comprise a hydrodesulfurization catalyst. The hydrotreating catalyst may comprise supported metals, such as one or more of W, Fe, Co, Ni, Mo; supported on silica, alumina, or both.

The hydrotreating temperature may be less than 1000° C., such as less than 800° C., less than 600° C., less than 500° C., less than 400° C., from 200 to 500° C., from 300 to 500° C., from 300 to 400° C., or any subset thereof.

The hydrotreating pressure may be at least 25 bar. For example, the hydrotreating pressure may be at least 50 bar, at least 75 bar, at least 100 bar, at least 125 bar, at least 150 bar, from 25 bar to 200 bar, from 50 bar to 200 bar, from 75 bar to 200 bar, from 100 bar to 200 bar, from 125 bar to 200 bar, or from 175 bar to 200 bar.

The hydrotreating atmosphere may be at least 10 mol. % hydrogen, at least 25 mol. % hydrogen, at least 50 mol. % hydrogen, at least 75 mol. % hydrogen, at least 90 mol. % hydrogen, or even at least 99 mol. % hydrogen.

The hydrotreating liquid hourly space velocity (LHSV) may be greater than $0.1\ h^{-1}$, greater than $0.2\ h^{-1}$, greater than $0.25\ h^{-1}$, greater than $0.28\ h^{-1}$, less than $0.5\ h^{-1}$, less than $0.4\ h^{-1}$, less than $0.35\ h^{-1}$, less than $0.32\ h^{-1}$, from $0.1\ h^{-1}$ to $0.5\ h^{-1}$, from $0.2\ h^{-1}$ to $0.4\ h^{-1}$, from $0.25\ h^{-1}$ to $0.35\ h^{-1}$, from $0.28\ h^{-1}$ to $0.32\ h^{-1}$, or any subset thereof.

Introducing the medium-light stream 120 to the hydrotreater 122 may produce a hydrotreated medium-light stream 124. The hydrotreated medium-light stream 124 may comprise at least 50 wt. % hydrocarbons. For example, the hydrotreated medium-light stream 124 may comprise at least 75 wt. %, at least 90 wt. %, at least 99 wt. %, at least 99.9 wt. %, at least 99.99 wt. %, at least 99.999 wt. % hydrocarbons. The hydrotreated medium-light stream 124 may comprise less than 1000 ppm, less than 500 ppm, less than 250 ppm, less than 125 ppm, less than 75 ppm, less than 25 ppm, less than 10 ppm, less than 1 ppm, or even less than 0.1 ppm sulfur. The hydrotreated medium-light stream 124 may comprise less than 1000 ppm, less than 500 ppm, less than 250 ppm, less than 125 ppm, less than 75 ppm, less than 25 ppm, less than 10 ppm, less than 1 ppm, or even less than 0.1 ppm nitrogen.

The method 100 of the present disclosure may comprise passing the medium-heavy stream 130 to a hydrocracker 134 to produce a hydrocracked medium-heavy stream 132. In some embodiments, the medium-heavy stream 130 may be passed directly to the hydrocracker 134.

In some embodiments, passing the medium-heavy stream 130 from the fractionator 104 to the hydrocracker 134 may include hydrotreating the medium-heavy stream. In other embodiments, the hydrocracker 134 may also function as a hydrotreater. In such embodiments, the hydrocracker may be a single reactor performing both functions or the hydrocracker 134 may refer to a hydrocracking complex. Such a hydrocracking complex may include both a hydrotreating reactor and a hydrocracking reactor.

In the hydrocracker 134, a hydrocarbon stream, such as the medium-heavy stream 130, may contact a hydrocracking catalyst in the presence of hydrogen, at a hydrocracking temperature, pressure, $H_2$/oil ratio, and LHSV. For example, the atmosphere around the hydrocracking catalyst may be at least 90 mol. %, at least 95 mol. %, at least 99 mol. % or at least 99.99 mol. % of the combination of hydrocarbons and hydrogen.

The hydrocracking catalyst may be any conventional or new hydrocracking catalyst. For example, the hydrocracking catalyst may comprise metals such as Co, Mo, Ni, and W, or combinations or sulfides of these. The metals may be supported on an acidic support material, such as silica, alumina, or zeolite.

The hydrocracking temperature may be from 350° C. to 450° C., from 360° C. to 440° C., or from 380° C. to 430° C.

The hydrocracking pressure may be from 80 to 200 bar. For example, the hydrocracking pressure may be from 100 to 180 bar, from 125 to 180 bar, from 150 to 180 bar, from 100 to 175 bar, from 100 to 150 bar, or from 100 to 125 bar.

The hydrocracking volumetric hydrogen/oil ratio may be from 800:1 to 1500:1, such as from 900:1 to 1500:1, from 1000:1 to 1500:1 from 1100:1 to 1500:1, from 1200:1 to 1500:1, from 800:1 to 1400:1, from 800:1 to 1300:1, from 800:1 to 1200:1, or any subset thereof.

The hydrocracking LHSV may be from 1 to 3 $h^{-1}$, such as from 2 to 3 $h^{-1}$, from 1 to 2 $h^{-1}$, or any subset thereof.

The hydrocracked medium-heavy stream 132 may have less than 2000 ppm of sulfur. For example, the hydrocracked medium-heavy stream 132 may have less than 1500 ppm, less than 1000 µm, less than 500 ppm, less than 250 ppm, less than 125 ppm, less than 50 ppm, less than 25 ppm, less than 10 ppm, or even less than 1 ppm of sulfur.

The hydrocracked medium-heavy stream 132 may have less than 2000 ppm of nitrogen. For example, the hydrocracked medium-heavy stream 132 may have less than 1500 ppm, less than 1000 µm, less than 500 ppm, less than 250 ppm, less than 125 ppm, less than 50 ppm, less than 25 ppm, less than 10 ppm, or even less than 1 ppm of nitrogen.

The hydrocracked medium-heavy stream 132 may then be passed to the catalytic reformer 150. In some embodiments, the hydrocracked medium-heavy stream 132 may be passed directly to the catalytic reformer.

Passing the hydrocracked medium-heavy stream 132 to the catalytic reformer 150 may comprise passing the hydrocracked medium-heavy stream 132 to a separator 136 to produce a second medium-heavy stream 138, and passing the second medium-heavy stream to the catalytic reformer. The hydrocracked medium-heavy stream 132 may be passed directly from the hydrocracker 134 to the separator 136. The second medium-heavy stream 138 may be passed directly from the separator 136 to the catalytic reformer 150.

In some embodiments, the hydrocracked medium-heavy stream 132 or the second medium-heavy stream 138 may be combined with one or more additional streams, such as the cracked light stream 114, hydrotreated medium-light stream 124, and the cracked heavy stream 144 before being passed to the catalytic reformer 150.

The separator 136 may be any conventional separation technique. For example, the separator 136 may include one or more of distillation columns, fractionators, flash drums, knock-out drums, knock-out pots, centrifuges, filtration devices, traps, scrubbers, expansion devices, membranes, solvent extraction devices, high-pressure separators, low-pressure separators.

The second medium-heavy stream 138 may comprise heavy naphtha. For example, at least 50 wt. %, at least 60 wt. %, at least 70 wt. %, at least 80 wt. %, at least 90 wt. %, at least 99 wt. %, or even at least 99.9 wt. % of the hydrocarbons in the hydrocracked medium-heavy stream 132 may have between 6 and 12 carbon atoms. The second medium-heavy stream 138 may have a lower cut point of at least 70° C. and an upper cut point of less than or equal to 200° C.

Passing the hydrocracked medium-heavy stream 132 to the separator 136 may further produce a second $C_2$-$C_6$ stream 139. At least 50 wt. %, at least 60 wt. %, at least 70 wt. %, at least 80 wt. %, at least 90 wt. %, at least 95 wt. %, at least 99 wt. %, or at least 99.9 wt. % of hydrocarbons in the second $C_2$-$C_6$ stream 139 may be $C_2$-$C_6$ hydrocarbons.

The method 100 may comprise passing the second $C_2$-$C_6$ stream 139 to the steam cracking unit 112 to produce the cracked light stream 114. It should be understood that the second $C_2$-$C_6$ stream 139 may be combined with the light stream 110 before being introduced to the steam cracking unit 112 or the second $C_2$-$C_6$ stream 139 and the light stream 110 may be combined within the steam cracking unit 112.

The method 100 may comprise passing the heavy stream 140 to a delayed coker 142 and thereby producing a cracked heavy stream 144. The heavy stream 140 may be passed directly from the fractionator 104 to the delayed coker 142. The method 100 may further comprise passing the cracked heavy stream 144 to the catalytic reformer 150. In some embodiments, the cracked heavy stream 144 may be passed directly from the delayed coker 142 to the catalytic reformer 150. In other embodiments, only a portion of the cracked heavy stream 144 may be passed to the catalytic reformer 150.

The delayed coker 142 may be one or more devices. For example, the delayed coker may be a delayed coking complex, integrating at least a furnace and one or more coke drums. In the coke drums, hydrocarbons, such as those in the heavy stream 140 may be exposed to a coking temperature, coking pressure, and coking time.

The coking temperature may be above the cracking temperature of the hydrocarbons. For example, the coking temperature may be at least 350° C., at least 400° C., at least 425° C., at least 450° C., at least 480° C., at least 500° C., from 450 to 550° C., from 480 to 500° C., or any subset thereof.

The coking pressure may be from 1 to 90 pounds per square inch gauge (psig). For example, the coking pressure may be from 15 to 90 psig, from 25 to 90 psig, from 1 to 60 psig, from 1 to 40 psig, from 1 to 30 psig, from 10 to 70 psig, from 15 to 50 psig, from 20 to 40 psig, or from 25 to 30 psig.

The coking time may be at least 2 hours. For example, the coking time may be at least 4 hours, at least 6 hours, at least 8 hours, at least 10 hours, at least 12 hours, at least 14 hours, from 2 to 16 hours, from 8 to 16 hours, from 8 to 12 hours, from 10 to 16 hours, or any subset thereof. The coking time may refer to the time from when the first hydrocarbon material enters the coking drum until the coking drum enters the decoking phase.

The cracked heavy stream 144 may comprise coke, $C_2$-$C_6$ hydrocarbons, coked light naphtha, coked heavy naphtha, and cracked gas oil. For example, the cracked heavy stream 144 may comprise from 20 wt. % to 30 wt. % of coke, from 5 wt. % to 12 wt. % of $C_2$-$C_6$ hydrocarbons, from 5 wt. % to 15 wt. % of heavy naphtha, and from 50 wt. % to 60 wt. % of cracked gas oil. The coke may be a solid carbonaceous material. The $C_2$-$C_6$ hydrocarbons may be at least 50 wt. %, at least 60 wt. %, at least 70 wt. %, at least 80 wt. %, at least 90 wt. %, or at least 99 wt. % of paraffinic or olefinic hydrocarbons having from 2 to 6 carbon atoms. The heavy naphtha may have a lower cut point of 60° C. to 70° C. and an upper cut point of 175° C. to 185° C. The cracked gas oil may have a lower cut point of from 175° C. to 185° C. and an upper cut point of 530° C. to 550° C. It should be understood that all of these fractions may be combined in a single stream.

Passing the cracked heavy stream 144 to the catalytic reformer 150 may comprise passing the cracked heavy stream 144 to a coke fractionator 145. It should be understood that the coke fractionator 145 may be a stand alone device or may be part of the delayed coker 142. The coke fractionator 145 may produce a coke stream 149.

Passing the cracked heavy stream 144 to the coke fractionator 145 may produce one or more of a second 65° C. to 180° C. stream 146, a third $C_2$-$C_6$ stream 147, and a liquid >180° C. stream 148.

The second 65° C. to 180° C. stream 146 may comprise at least 50 wt. % of $C_6$-$C_{12}$ hydrocarbons, based on the total weight of hydrocarbons in the second 65° C. to 180° C. stream 146. For example, the second 65° C. to 180° C. stream may comprise at least 60 wt. %, at least 70 wt. %, at least 80 wt. %, at least 90 wt. %, or at least 99 wt. % of $C_6$-$C_{12}$ hydrocarbons, based on the total weight of hydrocarbons in the second 65° C. to 180° C. stream 146.

The third $C_2$-$C_6$ stream 147 may comprise at least 50 wt. %, at least 60 wt. %, at least 70 wt. %, at least 80 wt. %, at least 90 wt. %, or at least 99 wt. % of $C_2$-$C_6$ hydrocarbons, based on the total weight of hydrocarbons in the third $C_2$-$C_6$ stream 147.

At least 50 wt. %, at least 60 wt. %, at least 70 wt. %, at least 80 wt. %, at least 90 wt. %, or at least 99 wt. % of the hydrocarbons in the third $C_2$-$C_6$ stream 147 may be paraffinic or olefinic.

The liquid >180° C. stream 148 may comprise hydrocarbons with a lower cut point of 170° C. to 190° C., or 175° C. to 185° C., or 180° C. The hydrocarbons of the liquid >180° C. stream 148 may be liquid at a temperature of less than 25° C., less than 50° C., less than 75° C., less than 100° C., less than 150° C., less than 200° C., less than 250° C., less than 300° C., less than 350° C., or less than 400° C. The hydrocarbons of the liquid >180° C. stream 148 may have an upper cut point of 540° C.

The method 100 may comprise passing the second 65° C. to 180° C. stream 146 to the catalytic reformer 150. In some embodiments, the second 65° C. to 180° C. stream may be passed directly to the catalytic reformer. As depicted in FIG. 1, the second 65° C. to 180° C. stream 146 may be passed to the hydrotreater 122. The combination of the medium-light stream 120 and the second 65° C. to 180° C. stream 146 may be hydrotreated and the effluent may be passed to the catalytic reformer 150.

The method 100 may comprise passing the liquid >180° C. stream 148 to the hydrocracker 134. The liquid >180° C. stream 148 may be combined with the medium-heavy stream 130 before entering the hydrocracker 134 or the two streams may enter the hydrocracker 134 separately.

The third $C_2$-$C_6$ stream 147 may be passed to the steam cracking unit 112.

The method 100 may comprise passing the medium-light stream 120, the hydrocracked medium-heavy stream 132, and the cracked heavy stream 144 to a catalytic reformer 150 to produce an aromatics stream 160. As described above, each of these streams may be passed directly to the catalytic reformer, or may undergo additional process steps such as hydrotreating, separations, and recycle before these streams, or portions thereof, reach the catalytic reformer.

Passing the various streams to the catalytic reformer 150 to produce the aromatics stream 160 may comprise contacting the hydrocarbons therein with a reforming catalyst at a reforming temperature, pressure, LHSV, and $H_2$/oil ratio. The catalytic reformer may be a continuous catalytic regeneration unit (CCR).

The reforming catalyst may comprise a metal, such as a precious metal. The precious metal may include platinum, ruthenium or both. The metal may be supported on a support material, such as silica, alumina, or silica-alumina. The reforming catalyst may be chlorided.

The reforming temperature may be from 400 to 600° C. For example, the reforming temperature may be from 450 to 600° C., from 500 to 600° C., from 400 to 550° C., from 450 to 550° C., or from 490 to 540° C.

The catalytic reforming liquid hourly space velocity (LHSV) may be greater than 0.1 $h^{-1}$, greater than 0.2 $h^{-1}$, greater than 0.25 $h^{-1}$, greater than 0.28 $h^{-1}$, less than 0.5 $h^{-1}$, less than 0.4 $h^{-1}$, less than 0.35 $h^{-1}$, less than 0.32 $h^{-1}$, from 0.1 $h^{-1}$ to 0.5 $h^{-1}$, from 0.2 $h^{-1}$ to 0.4 $h^{-1}$, from 0.25 $h^{-1}$ to 0.35 $h^{-1}$, from 0.28 $h^{-1}$ to 0.32 $h^{-1}$, or any subset thereof.

The reforming pressure may be from 1 to 50 bar. For example, the reforming pressure may be from 5 to 45 bar, from 10 to 40 bar, from 20 to 30 bar, from 1 to 40 bar, from 1 to 30 bar, from 1 to 20 bar, from 5 to 40 bar, from 5 to 30 bar, or from 5 to 20 bar.

The hydrocarbons may contact the reforming catalyst in the presence of hydrogen. The volumetric ratio of hydrogen: oil may be from 3:1 to 8:1, such as from 5:1 to 8:1, from 7:1 to 8:1, from 3:1 to 6:1, from 3:1 to 4:1 from 5:1 to 7:1, or any subset thereof.

The aromatics stream 160 may comprise olefins. For example, the aromatics stream may comprise at least 5 wt. %, at least 10 wt. %, at least 15 wt. % of olefin compounds, based on the total weight of hydrocarbons in the aromatics stream 160.

The aromatics stream 160 may comprise aromatic compounds. For example, the aromatics stream may comprise at least 25 wt. %, at least 30 wt. %, at least 40 wt. %, at least 45 wt. %, or at least 49 wt. % of the combined weight of benzene, toluene, and xylene, based on the total weight of hydrocarbons in the aromatics stream.

The aromatics stream 160 may comprise at least 2 wt. %, at least 3 wt. %, or at least 4 wt. % benzene, based on the total weight of hydrocarbons in the aromatics stream.

The aromatics stream 160 may comprise at least 5 wt. %, at least 8 wt. %, at least 10 wt. %, or at least 12 wt. % toluene, based on the total weight of hydrocarbons in the aromatics stream 160.

The aromatics stream 160 may comprise at least 10 wt. %, at least 15 wt. %, at least 20 wt. %, or at least 22 wt. % of the total weight of xylenes and ethyl-benzene, based on the total weight of hydrocarbons in the aromatics stream 160.

An apparatus for processing a hydrocarbon feed 102 may comprise a hydrotreater 122 in fluid communication with a fractionator 104 and a catalytic reformer 150, a hydrocracker 134 in fluid communication with the fractionator 104 and the catalytic reformer 150, a steam cracking unit 112 in fluid communication the fractionator 104, and a delayed coker 142 in fluid communication with the fractionator 104 and the catalytic reformer 150.

The delayed coker 142 may be in fluid communication with the catalytic reformer 150 through the hydrotreater 122.

The hydrocracker 134 may be in fluid communication with the catalytic reformer 150 through a separator 136.

The separator 136 may be in fluid communication with the steam cracking unit 112.

The delayed coker 142 may be in fluid communication with the hydrotreater 122 through a coke fractionator 145.

The coke fractionator 145 may be in fluid communication with the steam cracking unit 112 and the hydrocracker 134.

EXAMPLES

The various aspects of the present disclosure will be further clarified by the following examples. The examples are illustrative in nature and should not be understood to limit the subject matter of the present disclosure.

Example 1: Processing of AXL

In Example 1, an Arab Extra Light ("AXL") Crude Oil was utilized as the hydrocarbon feed in an exemplary process of the present disclosure. Properties of the hydrocarbon feed are given in Table 1: Hydrocarbon Feed Properties. A simulated cut point distribution is shown for the AXL.

TABLE 1

| Hydrocarbon Feed Properties | |
| --- | --- |
| AXL Properties | |
| Density, 60/60, (g/ml) | 0.8208 |
| S, wt % | 1.02 |
| N, ppmw | 435 |
| CCR, wt % | 1.68 |
| Ni, ppm | 1.0 |
| V, ppm | 2.1 |
| Simulated Cut Point Distribution | |
| <65° C. | 2.3 |
| 65-180° C. | 16.6 |
| 180-540° C. | 63.6 |
| >540° C. | 17.5 |

The AXL Crude Oil was fractionated into four streams, according to the methods of the present disclosure. The properties of the 540° C.+ residue stream are given below in Table 2: 540° C.+ Residue Properties.

TABLE 2

| 540° C. + Residue Properties | |
| --- | --- |
| Density, g/ml | 0.9806 |
| Sulfur, wt % | 2.82 |
| nitrogen, ppm | 1653 |
| CCR, wt % | 13.33 |
| Asphaltene, wt % | 1.46 |
| Ni, ppm | 6.33 |
| V, ppm | 15.87 |

Example 2: Delayed Coking the Residue

The 540° C.+ Residue described in "Table 2: 540° C.+ Residue Properties" was subjected to delayed coking using the parameters described in Table 3: Delayed Coking Parameters.

TABLE 3

| Delayed Coking Parameters | |
| --- | --- |
| Temperature: | 480-500° C. |
| Pressure: | 25-30 psig |

The coked residue was then fractionated to form a $C_1$ fraction, a 65° C. upper cut point fraction, a 65° C. lower cut point to 180° C. upper cut point fraction, a cracked gas oil fraction with a lower cut point of 180° C., and a solid coke fraction. The weight percentage of the coked residue which entered each of the fractions is described in Table 4: Delayed Coking Products, below.

TABLE 4

| Delayed Coking Products | |
| --- | --- |
| C1 | 2.1 wt. % |
| C2-C6 (<65° C.) | 8.3 wt. % |
| 65-180° C. | 9.9 wt. % |
| Cracked gas oil | 54.7 wt. % |
| Coke | 25 wt. % |

Example 3: Hydrocracking the 180-540° C. Streams

The cracked gas oil fraction produced in Example 2 was combined with the straight run 180° C.-540° C. fraction produced in Example 1 in a ratio of 83% straight run to 17% cracked gas oil to produce Sample 3A.

The same 540° C.+ residue fraction produced in Example 1 was subjected to solvent deasphalting to produce a deasphalted oil ("DAO"). Solvent desasphalting is a physical process where the asphaltene is removed by contacting with $C_3$ to $C_7$ paraffins. It is believed that there is little to no conversion of compounds which boil at temperatures of 540° C. or greater. The DAO was combined with the same 180° C.-540° C. fraction produced in Example 1 in a ratio of 83% straight run to 17% DAO, to produce Sample 3B.

The same 540° C.+ residue fraction produced in Example 1 was subjected to ebullated bed hydrocracking to produce an ebullated bed hydrocracked oil ("EBHCK"). Ebullated bed hydrocracking is a chemical conversion process which occurs at relatively great temperatures and pressures in the presence of hydrogen and one or more catalysts. It is believed that ebullated bed hydrocracking results in a relatively great degree of conversion of compounds which boil at temperatures of 540° C. or greater. The EBHCK was combined with the same 180° C.-540° C. fraction produced in Example 1 in a ratio of 83% straight run to 17% EBHCK, to produce Sample 3C.

Each of Examples 3A-3C were then subjected to hydrotreatment until the nitrogen content was less than 10 ppm. Each of the samples were then hydrocracked at the same conditions as one another. The conditions for the hydrotreatment and hydrocracking are given in Table 5: Hydrotreatment/Hydrocracking Conditions.

TABLE 5

Hydrotreatment/Hydrocracking Conditions

| Sample | 3A, 3B, 3C | | |
|---|---|---|---|
| HYDROTREATMENT CONDITIONS | | | |
| Catalyst | KFR-70 (from Albemarle) | | |
| Temperature,° C. | 390 | | |
| Pressure, bar | 150 | | |
| H$_2$/hydrocarbon ratio | 1200 | | |
| LHSV, h-1 | 0.5 | 0.2 | 0.5 |
| HYDROCRACKING CONDITIONS | | | |
| Catalyst | AHC-23 (developed by Aramco) | | |
| Temperature,° C. | 380 | | |
| Pressure, bar | 150 | | |
| H2/hydrocarbon ratio | 1200 | | |
| LHSV, h-1 | 2.0 | | |

DAO has more nitrogen than the delay coked or EBHCK gas oils. Accordingly, as can be seen in Table 5: Hydrotreatment/Hydrocracking Conditions, the hydrotreatment conditions required for the DAO containing Example 3B were much harsher than those required in Examples 3A and 3C.

The results of the hydrotreatment and hydrocracking are given as Example 3A, 3B, and 3C respectively, in Table 6: Hydrotreat/Hydrocrack Results. The results of the harsher hydrotreatment required of Example 3B can be seen in the yields of C$_7$-180° C. products and of greater than 180° C. products. Example 3B had significantly more of the >180° C. products and less of the C7-180° C. products than the other two examples did.

TABLE 6

Hydrotreat/Hydrocrack Results

| Feedstocks | Example 3A | Example 3B | Example 3C |
|---|---|---|---|
| Conversation, wt. % | 75 | 75 | 75 |
| Unconverted product | coke | pitch | 540° C. + oil |
| C$_1$ (wt. %) | 0.02 | 0.24 | 0.02 |
| C$_2$-C$_6$ (wt. %) | 35.78 | 30.82 | 40.35 |
| C$_7$-180° C. (wt. %) | 65.64 | 44.33 | 60.35 |
| >180° C. (wt. %) | 0 | 25.9 | 0 |

Example 4: Simulated Catalytic Reforming

Simulated catalytic reforming was performed on a commercial naphtha (referred to as "Comparative") and a hydrocracked naphtha (referred to as "Example") prepared according to the present disclosure. The Example naphtha was prepared by hydrocracking the 180-540° C. fraction produced in Example 1 at the conditions shown in Table 5: Hydrotreatment/Hydrocracking Conditions. The Comparative naphtha was the straight run 180° C.-540° C. fraction produced in Example 1 and not hydrocracked.

Parameters for the catalytic reforming process, details of the pre-reforming naphtha and the reformate are provided in Table 7: Simulated Catalytic Reforming.

TABLE 7

Simulated Catalytic Reforming

| | Comparative | Example |
|---|---|---|
| Feed Source (Straight-Run, FCC, Coker, etc.) | HSR Naphtha | HCK-Naphtha |
| Flowrate, MBPD | 47 | 47 |
| Catalyst | 1 wt. % Pt supported on alumina | 1 wt. % Pt supported on alumina |
| Temperature (° C.) | 500 | 500 |
| Residence Time (hr) | 0.2 | 0.2 |
| Pressure (bar) | 20 | 20 |
| Naphtha | | |
| Specific Gravity | 0.734 | 0.753 |
| Paraffins by wt %, | 72.1 | 49.9 |
| Naphthenes by wt % | 15.1 | 42.2 |
| Aromatics by wt % | 12.8 | 7.9 |
| Distillation Type (D86, TBP, Other) | BP-Vol(F) | BP-Vol(F) |
| IBP | 179 | 202 |
| 10% | 194 | 223 |
| 30% | 224 | 237 |
| 50% | 244 | 242 |
| 70% | 265 | 260 |
| 90% | 291 | 278 |
| EP | 340 | 319 |
| Reformate | | |
| C5+ volume yield, vol % | 82.5 | 81.3 |
| C5+ weight yield, wt % | 91.6 | 90.3 |
| H2 yield, wt % | 3.5 | 3.9 |
| H2 yield, SCF/bbl | 1650 | 1883 |
| Benzene, wt % | 4.5 | 1.4 |
| Toluene, wt % | 13.8 | 15.1 |
| Xylenes and EB, wt % | 23.1 | 28.1 |
| Total Aromatics, wt % | 64.7 | 75.4 |

Example 5: Simulated Catalytic Reforming

Each of Examples 3A-3C is integrated into the process of the present disclosure, to form Examples 5A, 5B, and 5C respectively. The results are given in Table 8: Simulated Overall Process. As can be seen in the table, Example 5A of the present disclosure has a greater yield of both BTX (benzene, toluene, xylene) and of total chemicals than either of the comparative examples 3B and 3C. The process variables for each step are as given in the Examples above. The feed to the simulated catalytic reformer for each of Examples 5A, 5B, and 5C includes a hydrotreated medium-light stream, a hydrotreated and hydrocracked medium-heavy stream; and the treated heavy streams of Examples 3A, 3B, and 3C respectively.

TABLE 8

Simulated Overall Process

| | Example 5A | Example 5B | Example 5C |
|---|---|---|---|
| Olefin yield, wt % | 15.7 | 14.1 | 16.0 |
| BTX yield, wt % | 50.0 | 31.7 | 39.1 |
| Total chemicals, wt % | 65.7 | 45.8 | 55.1 |

Aspects

In a first aspect of the present disclosure, a method of processing a hydrocarbon feed comprises fractionating the hydrocarbon feed into a light stream, a medium-light stream, a medium-heavy stream, and a heavy stream; passing the medium-heavy stream to a hydrocracker to produce a hydrocracked medium-heavy stream; passing the heavy stream to a delayed coker to produce a cracked heavy stream; and passing the medium-light stream, the hydrocracked medium-heavy stream, and the cracked heavy stream to a catalytic reformer to produce an aromatics stream; wherein: the light stream comprises at least 50 wt. % of $C_1$ to $C_6$ hydrocarbons, based on the total weight of hydrocarbons in the light stream; the medium-light stream comprises at least 50 wt. % of $C_6$ to $C_{12}$ hydrocarbons, based on the total weight of hydrocarbons in the medium-light stream; the medium-heavy stream comprises at least 50 wt. % of $C_{12}$ to $C_{40}$ hydrocarbons, based on the total weight of hydrocarbons in the medium-heavy stream; and the heavy stream comprises at least 50 wt. % of $C_{40}$ or larger hydrocarbons, based on the total weight of hydrocarbons in the heavy stream.

In a second aspect of the present disclosure, in conjunction with the first aspect, passing the light stream to a steam cracking unit to produce a cracked light stream.

In a third aspect of the present disclosure, in conjunction with either of the first or second aspects, the cracked light stream is not subject to catalytic reforming.

In a fourth aspect of the present disclosure, in conjunction with any of the first through third aspects, the light stream comprises at least 80 wt. % of $C_1$ to $C_6$ hydrocarbons, based on the total weight of hydrocarbons in the light stream.

In a fifth aspect of the present disclosure, in conjunction with any of the first through fourth aspects, the light stream has an upper cut point of from 60° C. to 70° C.

In a sixth aspect of the present disclosure, in conjunction with any of the first through fifth aspects, passing the medium-light stream to the catalytic reformer further comprises passing the medium-light stream to a hydrotreater to produce a hydrotreated medium-light stream and passing the hydrotreated medium-light stream to the catalytic reformer.

In a seventh aspect of the present disclosure, in conjunction with any of the first through sixth aspects, the medium-light stream comprises at least 80 wt. % of $C_6$ to $C_{12}$ hydrocarbons, based on the total weight of hydrocarbons in the medium-light stream.

In an eighth aspect of the present disclosure, in conjunction with any of the first through seventh aspects, the medium-light stream has a lower cut point of from 60° C. to 70° C. and an upper cut point of from 175° C. to 185° C.

In a ninth aspect of the present disclosure, in conjunction with any of the first through eighth aspects, passing the hydrocracked medium-heavy stream to the catalytic reformer comprises passing the hydrocracked medium-heavy stream to a separator to produce a second medium-heavy stream; and passing the second medium-heavy stream to the catalytic reformer.

In a tenth aspect of the present disclosure, in conjunction with any of the first through ninth aspects, passing the hydrocracked medium-heavy stream to the separator further produces a second $C_2$-$C_6$ stream, the method further comprising passing the second $C_2$-$C_6$ stream to the steam cracking unit to produce the cracked light stream.

In an eleventh aspect of the present disclosure, in conjunction with any of the first through tenth aspects, the medium-heavy stream has lower cut point of from 175° C. to 185° C. and an upper cut point of from 530° C. to 550° C.

In a twelfth aspect of the present disclosure, in conjunction with any of the first through eleventh aspects, the medium-heavy stream comprises at least 80 wt. % of $C_{12}$ to $C_{40}$ hydrocarbons, based on the total weight of hydrocarbons in the medium-heavy stream.

In a thirteenth aspect of the present disclosure, in conjunction with any of the first through twelfth aspects, passing the cracked heavy stream to the catalytic reformer comprises passing the cracked heavy stream to a coke fractionator to produce one or more of: a third $C_2$-$C_6$ stream, a liquid >180° C. stream, and a second 65° C. to 180° C. stream; and passing the second 65° C. to 180° C. stream to the catalytic reformer.

In a fourteenth aspect of the present disclosure, in conjunction with any of the first through thirteenth aspects, the second 65° C. to 180° C. stream comprises at least 80 wt. % of $C_6$-$C_{12}$ hydrocarbons, based on the total weight of hydrocarbons in the second 65° C. to 180° C. stream.

In a fifteenth aspect of the present disclosure, in conjunction with any of the first through fourteenth aspects, passing the second 65° C. to 180° C. stream to the catalytic reformer comprises passing the second 65° C. to 180° C. stream to a hydrotreater.

In a sixteenth aspect of the present disclosure, in conjunction with any of the first through fifteenth aspects, the method further comprises passing the liquid >180° C. stream to the hydrocracker and passing the third $C_2$-$C_6$ stream to the steam cracking unit.

In a seventeenth aspect of the present disclosure, in conjunction with any of the first through sixteenth aspects, the heavy stream has a lower cut point of at least 530° C.

In an eighteenth aspect of the present disclosure, in conjunction with any of the first through seventeenth aspects, the heavy stream comprises at least 80 wt. % of $C_{40}$ or larger hydrocarbons, based on the total weight of hydrocarbons in the heavy stream.

In a nineteenth aspect of the present disclosure, in conjunction with any of the first through eighteenth aspects, the hydrocarbon feed is a crude oil with an API gravity of at least 25.

In a twentieth aspect of the present disclosure, in conjunction with any of the first through nineteenth aspects, wherein a method of processing a hydrocarbon feed comprises fractionating the hydrocarbon feed into a light stream, a medium-light stream, a medium-heavy stream, and a heavy stream; passing the light stream to a steam cracking unit to produce a cracked light stream; passing the medium-heavy stream to a hydrocracker to produce a hydrocracked medium-heavy stream; passing the heavy stream to a delayed coker to produce a cracked heavy stream; and passing the medium-light stream, the hydrocracked medium-heavy stream, and the cracked heavy stream to a catalytic reformer to produce an aromatics stream; wherein: the light stream comprises at least 80 wt. % of $C_1$ to $C_6$ hydrocarbons, based on the total weight of hydrocarbons in the light stream; the medium-light stream comprises at least 80 wt. % of $C_6$ to $C_{12}$ hydrocarbons, based on the total weight of hydrocarbons in the medium-light stream; the medium-heavy stream comprises at least 80 wt. % of $C_{12}$ to $C_{40}$ hydrocarbons, based on the total weight of hydrocarbons in the medium-heavy stream; and the heavy stream comprises at least 80 wt. % of $C_{40}$ or larger hydrocarbons, based on the total weight of hydrocarbons in the heavy stream; passing the medium-light stream to the catalytic reformer further comprises passing the medium-light stream to a hydrotreater to produce a hydrotreated medium-light stream and passing the hydrotreated medium-light stream to the catalytic reformer; passing the hydrocracked medium-heavy stream to the catalytic reformer comprises passing the hydrocracked medium-heavy stream to a separator to produce a second medium-heavy stream; and passing the second medium-heavy stream to the catalytic reformer; passing the hydrocracked medium-heavy stream to the separator further produces a second $C_2$-$C_6$ stream, the method further comprising passing the second $C_2$-$C_6$ stream to the steam cracking unit to produce the cracked light stream; passing the cracked heavy stream to the catalytic reformer comprises passing the cracked heavy stream to a coke fractionator to produce one or more of: a third $C_2$-$C_6$ stream, a liquid >180° C. stream, and a second 65° C. to 180° C. stream; and passing the second 65° C. to 180° C. stream to the catalytic reformer; the second 65° C. to 180° C. stream comprises at least 80 wt. % of $C_6$-$C_{12}$ hydrocarbons, based on the total weight of hydrocarbons in the second 65° C. to 180° C. stream; passing the second 65° C. to 180° C. stream to the catalytic reformer comprises passing the second 65° C. to 180° C. stream to the hydrotreater.

In a twenty-first aspect of the present disclosure, in conjunction with any of the first through twentieth aspects, the hydrocarbon feed is a crude oil with an API gravity of at least 25.

In a twenty-second aspect of the present disclosure, in conjunction with any of the first through twenty-first aspects, the aromatics stream comprises of at least 25 wt. % of aromatic compounds.

In an twenty-third aspect of the present disclosure, in conjunction with any of the first through twenty-second aspects, the aromatics stream comprises of at least 60 wt. % of aromatic compounds.

It is noted that any two quantitative values assigned to a property may constitute a range of that property, and all combinations of ranges formed from all stated quantitative values of a given property are contemplated in this disclosure.

It is noted that one or more of the following claims utilize the term "where" as a transitional phrase. For the purposes of defining the present technology, it is noted that this term is introduced in the claims as an open-ended transitional phrase that is used to introduce a recitation of a series of characteristics of the structure and should be interpreted in like manner as the more commonly used open-ended preamble term "comprising."

Having described the subject matter of the present disclosure in detail and by reference to specific aspects, it is noted that the various details of such aspects should not be taken to imply that these details are essential components of the aspects. Rather, the claims appended hereto should be taken as the sole representation of the breadth of the present disclosure and the corresponding scope of the various aspects described in this disclosure. Further, it will be apparent that modifications and variations are possible without departing from the scope of the appended claims.

What is claimed is:

1. A method of processing a hydrocarbon feed comprising:
    fractionating the hydrocarbon feed into a light stream, a medium-light stream, a medium-heavy stream, and a heavy stream;
    passing the medium-heavy stream to a hydrocracker to produce a hydrocracked medium-heavy stream;
    passing the heavy stream to a delayed coker to produce a cracked heavy stream; and
    passing the medium-light stream, the hydrocracked medium-heavy stream, and the cracked heavy stream to a catalytic reformer to produce an aromatics stream;
    wherein:
        the light stream comprises at least 50 wt. % of $C_1$ to $C_6$ hydrocarbons, based on the total weight of hydrocarbons in the light stream;
        the medium-light stream comprises at least 50 wt. % of $C_6$ to $C_{12}$ hydrocarbons, based on the total weight of hydrocarbons in the medium-light stream;
        the medium-heavy stream comprises at least 50 wt. % of $C_{12}$ to $C_{40}$ hydrocarbons, based on the total weight of hydrocarbons in the medium-heavy stream; and
        the heavy stream comprises at least 50 wt. % of $C_{40}$ or larger hydrocarbons, based on the total weight of hydrocarbons in the heavy stream.

2. The method of claim 1, further comprising passing the light stream to a steam cracking unit to produce a cracked light stream.

3. The method of claim 2, wherein the cracked light stream is not subject to catalytic reforming.

4. The method of claim 1, wherein the light stream comprises at least 80 wt. % of $C_1$ to $C_6$ hydrocarbons, based on the total weight of hydrocarbons in the light stream.

5. The method of claim 1, wherein the light stream has an upper cut point of from 60° C. to 70° C.

6. The method of claim 1, wherein passing the medium-light stream to the catalytic reformer further comprises passing the medium-light stream to a hydrotreater to produce a hydrotreated medium-light stream and passing the hydrotreated medium-light stream to the catalytic reformer.

7. The method of claim 1, wherein the medium-light stream comprises at least 80 wt. % of $C_6$ to $C_{12}$ hydrocarbons, based on the total weight of hydrocarbons in the medium-light stream.

8. The method of claim 1, wherein the medium-light stream has a lower cut point of from 60° C. to 70° C. and an upper cut point of from 175° C. to 185° C.

9. The method of claim 1, wherein passing the hydrocracked medium-heavy stream to the catalytic reformer comprises passing the hydrocracked medium-heavy stream to a separator to produce a second medium-heavy stream; and passing the second medium-heavy stream to the catalytic reformer.

10. The method of claim 8, wherein passing the hydrocracked medium-heavy stream to the separator further produces a second $C_2$-$C_6$ stream, the method further comprising passing the second $C_2$-$C_6$ stream to the steam cracking unit to produce the cracked light stream.

11. The method of claim 1, wherein the medium-heavy stream has lower cut point of from 175° C. to 185° C. and an upper cut point of from 530° C. to 550° C.

12. The method of claim 1, wherein the medium-heavy stream comprises at least 80 wt. % of $C_{12}$ to $C_{40}$ hydrocarbons, based on the total weight of hydrocarbons in the medium-heavy stream.

13. The method of claim 1, wherein passing the cracked heavy stream to the catalytic reformer comprises passing the cracked heavy stream to a coke fractionator to produce one or more of:
    a third $C_2$-$C_6$ stream,
    a liquid >180° C. stream, and
    a second 65° C. to 180° C. stream; and passing the second 65° C. to 180° C. stream to the catalytic reformer.

14. The method of claim 12, wherein the second 65° C. to 180° C. stream comprises at least 80 wt. % of $C_6$-$C_{12}$ hydrocarbons, based on the total weight of hydrocarbons in the second 65° C. to 180° C. stream.

15. The method of claim 12, wherein passing the second 65° C. to 180° C. stream to the catalytic reformer comprises passing the second 65° C. to 180° C. stream to a hydrotreater.

16. The method of claim 12, further comprising passing the liquid >180° C. stream to the hydrocracker and passing the third $C_2$-$C_6$ stream to the steam cracking unit.

17. The method of claim 1, wherein the heavy stream has a lower cut point of at least 530° C.

18. The method of claim 1, wherein the heavy stream comprises at least 80 wt. % of $C_{40}$ or larger hydrocarbons, based on the total weight of hydrocarbons in the heavy stream.

19. The method of claim 1, wherein the hydrocarbon feed is a crude oil with an API gravity of at least 25.

20. A method of processing a hydrocarbon feed comprising
fractionating the hydrocarbon feed into a light stream, a medium-light stream, a medium-heavy stream, and a heavy stream;
passing the light stream to a steam cracking unit to produce a cracked light stream;
passing the medium-heavy stream to a hydrocracker to produce a hydrocracked medium-heavy stream;
passing the heavy stream to a delayed coker to produce a cracked heavy stream; and
passing the medium-light stream, the hydrocracked medium-heavy stream, and the cracked heavy stream to a catalytic reformer to produce an aromatics stream; wherein:
the light stream comprises at least 80 wt. % of $C_1$ to $C_6$ hydrocarbons, based on the total weight of hydrocarbons in the light stream;
the medium-light stream comprises at least 80 wt. % of $C_6$ to $C_{12}$ hydrocarbons, based on the total weight of hydrocarbons in the medium-light stream;
the medium-heavy stream comprises at least 80 wt. % of $C_{12}$ to $C_{40}$ hydrocarbons, based on the total weight of hydrocarbons in the medium-heavy stream; and
the heavy stream comprises at least 80 wt. % of $C_{40}$ or larger hydrocarbons, based on the total weight of hydrocarbons in the heavy stream;
passing the medium-light stream to the catalytic reformer further comprises passing the medium-light stream to a hydrotreater to produce a hydrotreated medium-light stream and passing the hydrotreated medium-light stream to the catalytic reformer;
passing the hydrocracked medium-heavy stream to the catalytic reformer comprises passing the hydrocracked medium-heavy stream to a separator to produce a second medium-heavy stream; and passing the second medium-heavy stream to the catalytic reformer;
passing the hydrocracked medium-heavy stream to the separator further produces a second $C_2$-$C_6$ stream, the method further comprising passing the second $C_2$-$C_6$ stream to the steam cracking unit to produce the cracked light stream;
passing the cracked heavy stream to the catalytic reformer comprises passing the cracked heavy stream to a coke fractionator to produce one or more of:
a third $C_2$-$C_6$ stream,
a liquid >180° C. stream, and
a second 65° C. to 180° C. stream; and
passing the second 65° C. to 180° C. stream to the catalytic reformer, the second 65° C. to 180° C. stream comprises at least 80 wt. % of $C_6$-$C_{12}$ hydrocarbons, based on the total weight of hydrocarbons in the second 65° C. to 180° C. stream;
passing the second 65° C. to 180° C. stream to the catalytic reformer comprises passing the second 65° C. to 180° C. stream to the hydrotreater.

\* \* \* \* \*